United States Patent [19]

Christy

[11] Patent Number: 4,613,378

[45] Date of Patent: Sep. 23, 1986

[54] METHOD OF RESTORING MARBLE AND BRICK SURFACES

[76] Inventor: Lawrence Christy, 6015 10th Pl., Hyattsville, Md. 20782

[21] Appl. No.: 669,432

[22] Filed: Nov. 8, 1984

[51] Int. Cl.$^4$ ............................................... B08B 3/08
[52] U.S. Cl. .......................................... 134/2; 134/4; 134/29; 134/30; 252/135; 252/140
[58] Field of Search ........................ 134/2, 4, 29, 30; 252/135, 140

[56] References Cited

U.S. PATENT DOCUMENTS

| | | | |
|---|---|---|---|
| 1,870,312 | 8/1932 | Gangloff | 252/135 |
| 2,257,545 | 9/1941 | Curtis | 252/140 X |
| 3,529,999 | 9/1970 | Boeniger | 134/2 |
| 3,728,267 | 4/1973 | Hirota et al. | 134/4 X |
| 4,483,716 | 11/1984 | Heller | 134/4 X |

FOREIGN PATENT DOCUMENTS 469333  7/1937  United Kingdom .................... 134/2

*Primary Examiner*—Joseph Golian
*Attorney, Agent, or Firm*—Brady, O'Boyle & Gates

[57] ABSTRACT

A marble and brick surface restoring composition comprising a mixture of trisodium phosphate, talc and sugar, which is prepared by dissolving the trisodium phosphate in boiling water to which is added the talc and sugar to form a paste. The paste is applied to the surface to be restored by a suitable applicator such as a brush or trowel; the coated surface is covered with a thin plastic sheet and the coating is allowed to set. The composition is removed from the restored surface by a squeegee and the surface is rinsed with water or steam.

When restoring detailed surfaces, such as headstones, cheese cloth is first wrapped around the surface and the paste is sprayed thereon to form a poultice which is covered with a thin plastic sheet. After setting, the poultice is peeled from the surface and the restored surface is rinsed with water or steam.

3 Claims, No Drawings

METHOD OF RESTORING MARBLE AND BRICK SURFACES

BACKGROUND OF THE INVENTION

Buildings and tombstones having marble and brick surfaces exposed to the environment accumulate a surface film of dirt, discoloration, and other foreign matter most often derived from pollutants in the atmosphere. Heretofore, these surfaces have been cleaned by either sand blasting or by application of an acid. These methods have not been entirely satisfactory due to the detrimental effect, not only on the surface being cleaned, but also on the personnel engaged in the cleaning operation.

After considerable research and experimentation, the composition and method of restoring marble and brick surfaces of the present invention have been devised which effectively removes the dirt film from the surface while at the same time having no adverse effects on the surface being cleaned nor on the personnel engaged in the cleaning operation. The composition of the present invention comprises, essentially, a mixture of trisodium phosphate, talc and sugar, which is prepared by dissolving the trisodium phosphate in boiling water to which is added the talc and sugar to form a paste. The method of the present invention for restoring marble or brick surfaces comprises, essentially, applying the paste composition to the surface to be restored by means of a suitable applicator such as a brush or trowel; covering the coated surface with a thin plastic sheet; allowing the coating to set; removing the composition from the restored surface and rinsing the surface with water to steam. When restoring detailed surfaces, such as headstones, cheese cloth is first wrapped around the surface and the paste is sprayed thereon to form a poultice which is covered with a thin plastic sheet. After setting, the poultice is peeled from the surface and the restored surface is rinsed with water or steam.

DESCRIPTION OF THE PREFERRED EMBODIMENT

The composition of the present invention is prepared by dissolving one pound of trisodium phosphate crystals in one-half gallon of boiling water, and then adding one-half gallon of cold water to the aqueous solution of trisodium phosphate. The solution is thoroughly stirred and then allowed to stand until cool. If any sediment should result, the trisodium phosphate solution is passed through a suitable filter to remove any sediment of trisodium phosphate.

If the composition is to be sprayed onto the surface to be restored, six pounds of talc and six teaspoonsful of sugar are added to the one gallon of trisodium phosphate solution to form a liquid composition. The trisodium phosphate is employed for loosening the dirt from the surface to be restored; the talc draws the loosened dirt from the surface and the sugar is used to enhance the flowability of the composition.

If the composition is to be brushed or trowelled on the surface to be restored, ten pounds of talc and ten teaspoonsful of sugar are added to the one gallon of trisodium phosphate solution to form a thick paste.

In use, assuming the surface to be restored is relatively flat, the thick paste composition described above is applied to the surface by a suitable applicator such as a brush or wooden trowel. The coated surface is then covered with a thin plastic sheet and the coating is allowed to set. After the coating has set, the plastic cover is removed and the coating is removed from the surface by means of a squeegee. The restored surface is then rinsed with water or steam.

When restoring detailed surfaces, that is, embossed surfaces having many peaks and crevices found in many headstones, cheese cloth is first wrapped around the surface to be restored and the liquid composition described hereinabove is sprayed onto the cheese cloth. The coated cheese cloth forms a poultice wherein the composition is applied to all the crevices and peaks on the surface. A thin plastic sheet is applied to cover the poultice to allow the coating to set. After setting, the poultice is peeled from the surface and the restored surface is rinsed with water or steam.

In most instances, the mere application and removal of the composition of the present invention will be sufficient to restore the marble or brick surface; however, in some instances where there has been a substantial accumulation of surface dirt, discoloration or the like, before rinsing, the coated surface can be buffed with brushes having non-abrasive bristles, and if desired, fine sand or quartz can be sprinkled on the surface during the buffing operation.

It is to be understood that the form of the invention herewith shown and described is to be taken as a preferred example of the same, and that various changes in the shape, size and arrangement of parts may be resorted to, without departing from the spirit of the invention or scope of the subjoined claims.

I claim:

1. A method of restoring marble and brick surfaces by removing accumulated dirt, discoloration, and other foreign matter therefrom comprising:
   (a) covering the surface to be restored with cheese cloth;
   (b) spraying the cheese cloth with a composition containing an aqueous solution of trisodium phosphate, talc and sugar, said trisodium phosphate being employed to loosen the dirt from the surface, the talc being employed to draw the loosened dirt from the surface and the sugar being employed to enhance the flowability of the composition;
   (c) covering the coated cheese cloth with a thin plastic cover;
   (d) allowing the coating to set on the surface;
   (e) removing the thin plastic cover;
   (f) removing the composition from the surface by peeling the cheese cloth therefrom; and
   (g) rinsing the surface with water or steam.

2. The method according to claim 1, wherein the aqueous solution of trisodium phosphate is prepared by dissolving one pound of trisodium phosphate crystals in one-half gallon of boiling water and then adding one-half gallon of cold water.

3. The method according to claim 1, wherein the aqueous solution of trisodium phosphate contains six pounds of talc and six teaspoonsful of sugar, to thereby provide a liquid composition.

* * * * *